United States Patent [19]
Luong et al.

[11] Patent Number: 5,835,813
[45] Date of Patent: Nov. 10, 1998

[54] PICTURE DISPLAY APPARATUS IN WHICH THE LOWER PART OF THE PICTURE IS SHIFTED

[75] Inventors: Jean-Luc Luong, Dreux; Régis Vingtrois, Port-en-Bessin, both of France

[73] Assignee: U.S. Philips Corporation, New York, N.Y.

[21] Appl. No.: 694,057

[22] Filed: Aug. 8, 1996

[30] Foreign Application Priority Data

Aug. 9, 1995 [FR] France .................................. 95 09677

[51] Int. Cl.⁶ ....................................................... H04N 7/01
[52] U.S. Cl. ............................ 348/445; 348/556; 348/704
[58] Field of Search ..................................... 348/445, 556, 348/704, 553, 558, 555, 581

[56] References Cited

U.S. PATENT DOCUMENTS

| | | | |
|---|---|---|---|
| 4,953,025 | 8/1990 | Saitoh et al. .............................. | 348/445 |
| 5,136,398 | 8/1992 | Rodrignez-Cavazos et al. ...... | 348/445 |
| 5,168,362 | 12/1992 | Yoshida .................................... | 348/445 |
| 5,298,994 | 3/1994 | Watanabe et al. ....................... | 348/445 |
| 5,486,870 | 1/1996 | Decreamer ............................... | 348/556 |
| 5,534,934 | 7/1996 | Katsumota et al. ..................... | 348/445 |
| 5,631,710 | 5/1997 | Kamogawa et al. .................... | 348/556 |
| 5,638,132 | 6/1997 | Hokari et al. ............................ | 348/556 |
| 5,675,389 | 10/1997 | Oda ........................................... | 348/556 |

FOREIGN PATENT DOCUMENTS

0540077A1   5/1993   European Pat. Off. .

*Primary Examiner*—Victor R. Kostak
*Attorney, Agent, or Firm*—Eward W. Goodman

[57] ABSTRACT

The vertical scanning circuit of an apparatus is of a type which provides a sawtooth whose slope is electrically adjustable, and the apparatus provides the user with circuitry for controlling the position of the lower part of the picture by directly acting on the adjustment of the slope of the sawtooth, even though such an adjustment is generally realized in the factory or during maintenance. To this end, the vertical shift keys (19, 21) of the remote control unit are used to modify the slope of the sawtooth when a menu displayed on the screen is not being used.

8 Claims, 2 Drawing Sheets

PICTURE DISPLAY APPARATUS IN WHICH THE LOWER PART OF THE PICTURE IS SHIFTED

BACKGROUND OF THE INVENTION

1. Field of the Invention

The invention relates to a picture display apparatus having a 16/9 format display screen, comprising vertical and horizontal scanning circuits of known type, the vertical scanning circuit of the apparatus being of a type which supplies a sawtooth whose slope is adjustable by assigning a slope control value to a control input, and comprising a control receiver for receiving, from a user, a command for adjusting the amplitude of the scannings may be modified by a user for changing the dimensions of a picture displayed on the screen in order to realize a zoom function.

2. Description of the Related Art

A picture display apparatus of the type described in the opening paragraph is known from the document U.S. Pat. No. 5,486,870.

In a prior-art apparatus, in which a letterbox format picture is transmitted with sub-titles placed outside the picture, the sub-titles have to be made visible by reducing the global dimension of the picture with respect to the dimension it would have in the absence of sub-titles.

SUMMARY OF THE INVENTION

It is an object of the invention to limit the reduction of the dimension of the picture, which is necessary in this case.

Said slope control value being a digital value, and the vertical scanning circuit being of a type such that the position of the upper limit of the picture is not altered when the slope of the sawtooth is adjusted, the control receiver comprises means for receiving, from the user, a command for which control receiver is connected to a processor provided with means for interpreting said command and for applying an adapted slope control value to the control input.

This enables the user to choose a slope value which is "abnormal" in the way that it has the effect of raising the lower part of the displayed image.

Advantageously, the apparatus is provided with a remote control unit comprising shift keys, at least one key of which is used for a shift downwards and one key for a shift upwards, while the processor is provided with means for varying said slope control value in one sense or another when the control receiver receives a signal from either the one or the other key.

It is thus not necessary to provide special keys for controlling the slope, which is advantageous because it prevents an excess of keys.

The processor is preferably provided with means for adding one increment to the slope control value whenever one of the shift keys is activated.

A precision control is thus obtained more easily.

The apparatus with which a selection of various television programs can be received, comprises means for informing the processor of a program change, and the processor is provided with means for causing the slope control value to resume its normal level when a program change has occurred.

This is advantageous because it is difficult to foresee, during a change of programs, whether the new program necessitates the same control as before.

The apparatus, with which pictures of different formats can be displayed in different ways, comprises means for informing the processor of a format change, and the processor is provided with means for causing the slope control to resume the normal state when a format change has occurred.

This is advantageous because it is not very probable after a format change that the new format will necessitate the same control as before.

The apparatus advantageously comprises means for displaying a sign on the screen while the slope is being controlled for the purpose of raising the lower part of the picture.

The user thus verifies that he does not make a mistake with the command and that the effect obtained is correct.

The apparatus also comprises means for discontinuing the display of the sign on the screen when, in response to a subsequent activation of a key, the slope control has resumed its nominal value.

The user is thus informed that the lower part of the picture has taken up its nominal position again without having to change the program or the format for finding this position again.

These and other aspects of the invention will be apparent from and elucidated with reference to the embodiments described hereinafter.

DESCRIPTION OF THE PREFERRED EMBODIMENT

The invention will be described with reference to a television apparatus, but it is also applicable to any picture display apparatus, for example, a monitor.

Figure 1:
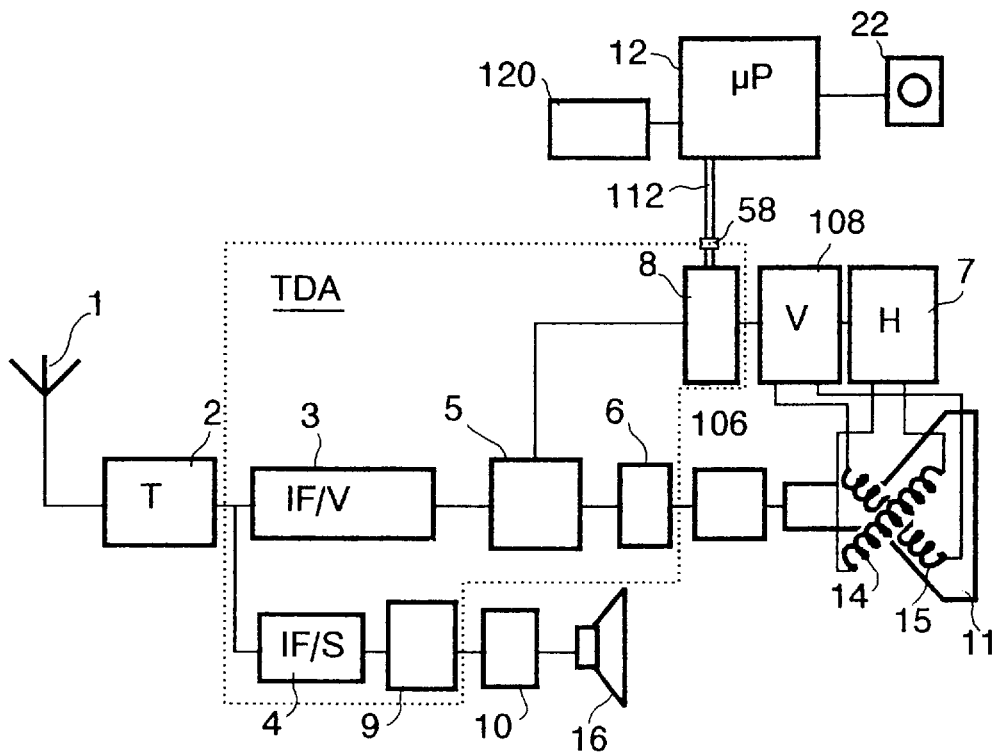
FIG. 1 shows diagrammatically a television receiver.

The television apparatus, the diagram of which is shown in FIG. 1, comprises a tuner 2 receiving a signal, for example, from an antenna 1 and transposing its frequency to intermediate frequencies intended for a subsequent IF video amplifier 3 and an IF audio amplifier 4.

The IF audio amplifier 4 is followed by a demodulator 9 which supplies the audio signals in the baseband to an audio power amplifier 10 feeding a loudspeaker 16.

The IF video amplifier 3 is followed by an element 5 comprising a demodulator which produces a video signal in the baseband for a video preamplifier 6 which is followed by an RF video amplifier 106 supplying signals ad hoc to electrodes of a cathode ray tube 11.

The element 5 also comprises a separator which extracts synchronizing signals from the signal supplied by the demodulator, these synchronizing signals being applied to a line-scanning power stage 7 and to a stage 8 for generating vertical or field-scanning sawtooth signals, feeding a field-scanning power stage 108 via a direct connection. The line and field power stages 7 and 108 supply currents in main line and field deflection coils 14 and 15.

The video, audio and synchronizing signals may also be supplied from an exterior source such as a satellite decoder or a video recorder.

The television receiver is provided with a processor 12, usually a microprocessor, for controlling the whole of its functions. Many circuits of a modern television receiver are digitally controlled circuits, i.e., different controls are obtained by means of digital values applied to a control input. These values are managed by the microprocessor with which a memory 120 is associated for storing data such as, inter alia, the current values of the different television controls. The microprocessor is connected to all the elements for the apparatus by means of a bus, one portion 112 of which is connected to an input 58 for programming the circuit 8 for generating the field-scanning sawtooth.

A control receiver 22 is provided for receiving infrared signals in known manner from a remote control unit and for applying them to the microprocessor 12.

In a known manner of realizing the circuit 8 for generating the field-scanning sawtooth signal, the sawtooth is obtained by charging a capacitance by means of a current generator. Those skilled in the art can readily create a current generator whose current is adjustable by assigning a control value to an input, and use this generator for charging said capacitance. Thus, a field-scanning circuit can be created which provides a sawtooth whose slope is adjustable by assigning a slope control value to a control input. There are also commercially available circuits, notably integrated circuits, which, on their own, take over the role of a plurality of constituents of a television receiver, such as the circuit TDA 8366 of the Philips Company. This circuit TDA 8366 assembles the elements encircled by a broken line in FIG. 1 on a single unit with, inter alia, the circuit 8 for generating the field-scanning sawteeth, and provides the possibility of adjusting some twenty parameters, notably concerning horizontal and vertical scanning, video signal characteristics, etc. For this purpose, it has an input for a standard bus (standard I2C) by means of which the control data are introduced by the microprocessor: after addressing the circuit TDA 8366, a sub-address is specified for defining the specific parameter to be adjusted, and then the value of this parameter is specified and subsequently stored in the circuit TDA 8366 itself. The slope of the sawtooth for vertical scanning is adjustable by assigning a value between 0 and 63 to a register, corresponding to the sub-address &H08.

Figure 2:
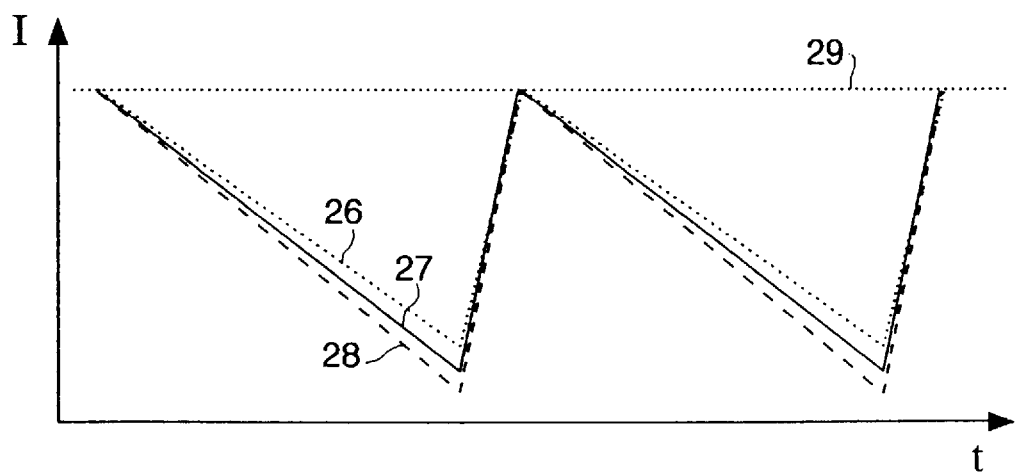
FIG. 2 is a diagram showing how the sawtooth current is modified by the slope control.

Vertical scanning currents are shown in FIG. 2 in such a way that the peaks in the Figure correspond to the highest position of the spot on the screen. This position may be situated beyond the screen in the case where the amplitude of the scanning current gives the spot movement an amplitude which is higher than the height of the screen, as can be seen in FIG. 3. Three sawtooth curves 26, 27, 28 represent current control examples obtained for each example by applying a digital value to the programming input. Each time, the upper part of the picture 29 remains in the same position but the position of the lower part of the picture evolves.

Figures 3A, 3B:
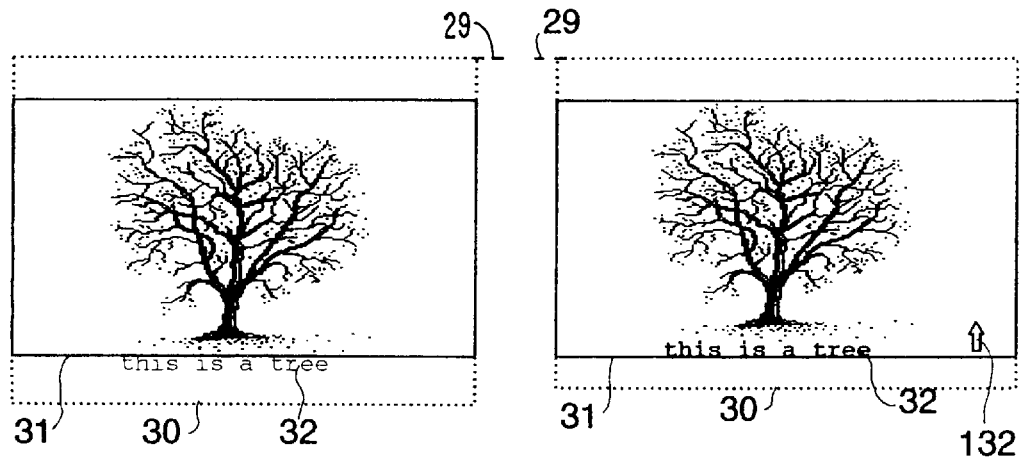
FIG. 3 illustrates the effect produced on a screen of a television apparatus.

In FIG. 3A, the picture of a tree is displayed on a display screen 31 of a 16/9 format. This picture may actually come from a TV program broadcast in the 4/3 format whose exterior picture contour is indicated by means of a dotted line 30. In the 4/3 format, a film in the cinemascope format is often transmitted in such a way that, in the case of a 4/3 screen, black bars are shown at the upper and lower parts of the useful picture, which type of picture is referred to as letterbox. In the case of a 16/9 screen, it is interesting to be able to modify the amplitude of one of the scans so that the dimensions of a picture displayed on the 16/9 screen can be changed. One manner of providing such a possibility is described in detail in the afore-mentioned document U.S. Pat. No. 5,486,870. It will also be evident that, as far as the vertical amplitude is concerned, this possibility is based on a programming of the circuit TDA 8366 with which the vertical amplitude can be controlled. When this possibility is used, the 4/3 format letterbox picture is enlarged in this case, so that it has a virtual exterior contour 30. However, the parts outside the screen 31 are not visible, but this is not troublesome because they are black bars. Nevertheless, it may occur, as in this case, that a sub-title 32 is placed in the lower black bar.

In FIG. 3B, the same picture is shown with a reduction of the slope of the field-scanning sawtooth. The upper part of the picture is always in the same position, denoted by a broken line 29, outside the screen, but the lower part 30 of the picture is higher, which renders the sub-title 32 visible. The microprocessor comprises, or has the disposal of, known associated means for displaying a sign on the screen, for example an arrow 132. These means are activated when a shift key is used for raising the lower part of the picture. The arrow 132 is displayed temporarily and is erased when the control of the slope resumes its nominal value in response to activating a key.

Figure 4:
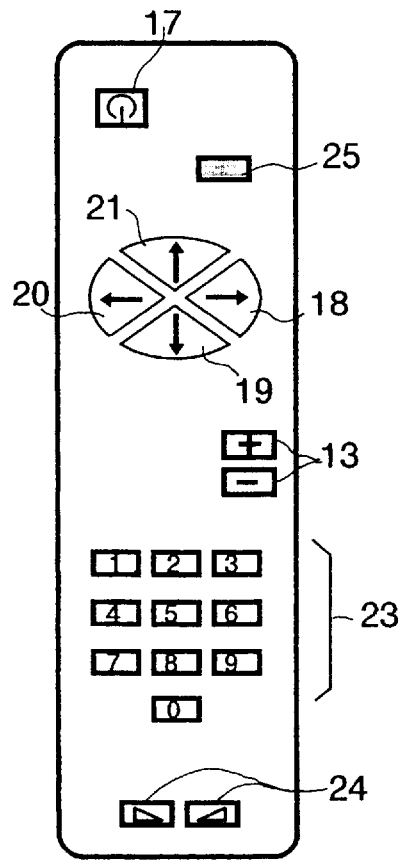
FIG. 4 shows a remote control unit for the television receiver, provided with shift keys.

A general, known procedure of controlling a television receiver consists of the use of menus displayed on the screen. The remote control unit shown in FIG. 4 comprises in known manner a standby key 17, a menu key 25, a pair of volume control keys 24, a set of digits 23 for program selection, keys 13 for increasing or decreasing the value of a parameter, a set of four keys 18-21, inter alia, for calling pages through a menu. To control a parameter, it is generally necessary to call several pages. In order to simplify the control procedure for the position of the low part of the picture, the set of four keys 18-21 of the remote control unit has not only been given its function of calling pages through the menus but also a simplified acquisition function. This function is active when no menu is present on the screen, i.e., when no menu program is being carried out. Thus, when the key 19 or the key 21 is pressed, the microprocessor, based on a value previously fixed in the register for the sub-address &H08, applies an increment to this value, thereby increasing the slope (key 19) or decreasing it (key 21). Subsequently, each activation of the key will continue incrementation of the value in this register so as to optimally adjust the sub-title position. The value of this register can never be higher than the nominal value set during manufacture of the television receiver (this means that the user cannot lower the low part of the picture with respect to the position shown in FIG. 3A). The presence of the nominal value in the register erases the arrow 132.

We claim:

1. A picture display apparatus having a 16/9 format display screen, comprising vertical and horizontal scanning circuits, the vertical scanning circuit supplying a sawtooth signal having a slope which is adjustable by assigning a slope control value to a control input, the apparatus further comprising a control receiver for receiving, from a user, a command for adjusting amplitudes of output signals from the vertical and horizontal scanning circuits for changing dimensions of a picture displayed on the display screen in order to realize a zoom function, characterized in that said slope control value is a digital value, and the vertical scanning circuit does not alter a position of an upper limit of the picture when a slope of the sawtooth signal is adjusted, the control receiver comprising means for receiving, from the user, a command for controlling position of a lower part of the picture, said control receiver being connected to a processor having means for interpreting said command and for applying an adapted slope control value to the control input of the vertical scanning circuit.

2. A picture display apparatus as claimed in claim 1, wherein said picture display apparatus is further provided with a remote control unit comprising shift keys, at least one of said shift keys being used for a shift downwards and another of said shift keys being used for a shift upwards, characterized in that the processor further comprises means for varying said slope control value in an upward direction or in a downward direction when the control receiver receives a signal from the remote control unit corresponding to either the one or the other of said shift keys.

3. A picture display apparatus as claimed in claim 2, characterized in that the processor comprises means for adding one increment to the slope control value whenever one of the shift keys is activated.

4. A picture display apparatus as claimed in claim 1, wherein said picture display apparatus is suitable for receiving a selection of various television programs, characterized in that said picture display apparatus comprises means for informing the processor of a program change, and the processor comprises means for causing the slope control value to resume a normal value after said program change.

5. A picture display apparatus as claimed in claim 1, wherein said picture display apparatus is capable of displaying pictures of different formats in different ways, characterized in that said picture display apparatus comprises means for informing the processor of a format change, and the processor comprises means for causing the slope control to resume a normal state after said format change.

6. A picture display apparatus as claimed in claim 1, characterized in that said picture display apparatus comprises means for displaying a sign on the screen when a shift key is activated for raising the lower part of the picture.

7. A picture display apparatus as claimed in claim 6, characterized in that the means for displaying the sign on the screen temporarily displays the sign when a shift key is activated.

8. A picture display apparatus as claimed in claim 7, characterized in that said picture display apparatus comprises means for discontinuing the display of the sign on the screen when, in response to a subsequent activation of a key, the slope control has resumed a nominal value.

\* \* \* \* \*